(12) United States Patent
Van Noy

(10) Patent No.: US 6,460,410 B1
(45) Date of Patent: Oct. 8, 2002

(54) TRACTION MEASURING TOOL

(75) Inventor: Gary L. Van Noy, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/650,062

(22) Filed: Aug. 29, 2000

(51) Int. Cl.$^7$ ................................................ G01L 3/00
(52) U.S. Cl. ........................ 73/159; 73/849; 73/862.191
(58) Field of Search .......................... 226/42; 73/159, 73/135, 812, 849, 862.28, 862.191; 101/219; 74/102

(56) References Cited

U.S. PATENT DOCUMENTS

| | | | |
|---|---|---|---|
| 3,759,432 A | * | 9/1973 | Hutzenlaub ................ 226/42 |
| 3,950,986 A | | 4/1976 | Parkinson |
| 4,062,233 A | | 12/1977 | Bonomo |
| 4,538,516 A | * | 9/1985 | Aaron ........................ 101/219 |
| 4,760,745 A | | 8/1988 | Garshelis |
| 5,440,938 A | | 8/1995 | Leon et al. |
| 5,705,757 A | | 1/1998 | Wozniak |
| 5,892,157 A | * | 4/1999 | Syre ............................. 73/812 |

* cited by examiner

*Primary Examiner*—Eric S. McCall
(74) *Attorney, Agent, or Firm*—Mark G. Bocchetti

(57) ABSTRACT

A tool is taught for measuring force transferred from a moving web to an idler roller. The tool includes a first drive shaft having a distal end adapted to be inserted into a capture bearing mounted on the idler roller. There is a torque meter rotationally driven by the first drive shaft through the rotation of the idler roller, the torque meter including a manual braking handle. The tool further includes a tachometer also rotationally driven by the first drive shaft through the rotation of the idler roller, the torque meter registering the force transferred by the moving web to the idler roller when the manual braking handle is operated to show a reduction in the rotational speed of the idler roller.

8 Claims, 2 Drawing Sheets

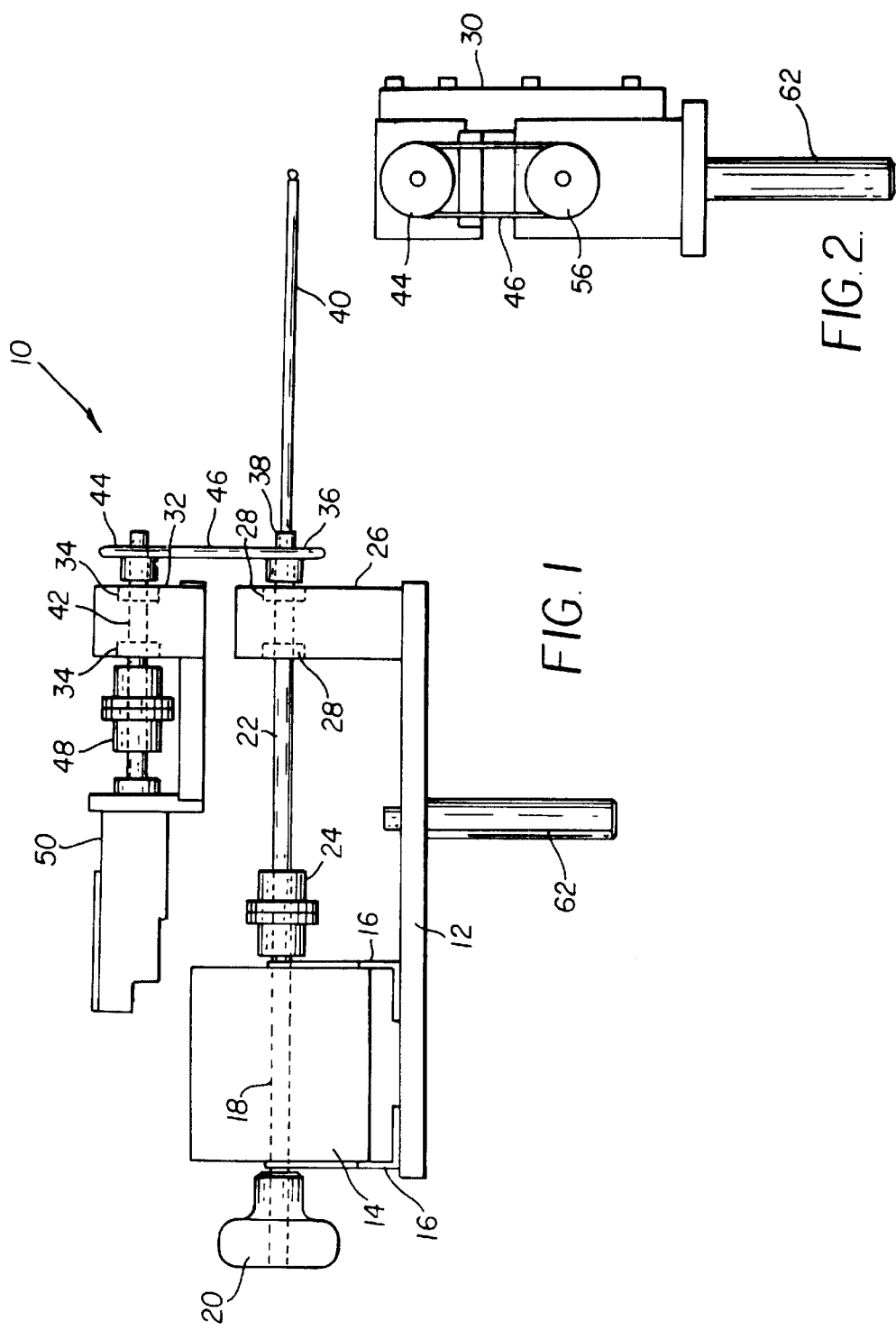

TRACTION MEASURING TOOL

FIELD OF THE INVENTION

The present invention relates generally to force measuring devices and, more particularly, to devices for measuring the force transferred from a driven element to a rotating, non-driven element such as a moving web and an idler roller.

BACKGROUND OF THE INVENTION

There are a variety of processes wherein a moving web is driven through a system. Quite often these processes involve the production or coating of the moving web. Thus, the moving web is typically driven by a drive roller through a predetermined and often serpentine web path that may include one or more idler rollers. In order to control the process, it is often necessary to determine the force transferred from the moving web to an idler roller. Typically this measurement is currently made using a prony brake that utilizes a rope wrapped around an idler roller or drum and which can be operated only from inside the machine. Machines for the production of film base as well as machines used to sensitize film base are fully enclosed such that the environment within the enclosure can be controlled to facilitate various manufacturing operations such as curing or drying of web or emulsions. The enclosures also enable the recovery of solvents. The rope is attached to both ends of a spring scale with the aid of an alignment pulley. A first person pulls the spring scale in a direction to tighten the rope. As the roller starts to stall as determined by a second person operating a tachometer, the prony brake operator reads the force in inch-pounds.

In that many of the processes where it is necessary to measure the force transferred from the moving web to an idler roller are operated in enclosed environments such as the coating of photographic films, the prior art tool and method have serious shortcomings. The use of the prior art prony brake results in the interruption (an interruption is defined as any time a machine is running in a non standard mode) of various process conditions such as temperature, humidity, solvent loading, not to mention the effect on the process as a result of the loss of traction through the operation of the prony brake. Further, because many of the processes are operated in enclosed environments it is necessary for the operators of the prony brake and the tachometer to enter the closed environment thereby exposing the operators quite often to elevated temperatures and high solvent vapor concentrations often necessitating the use of cumbersome safety equipment.

SUMMARY OF THE INVENTION

It is therefore an object of the present invention to provide a device for measuring the force transferred from a driven web to an idler roller.

It is a further object of the present invention to provide a device for measuring torque between elements where one is driven (web) and one is idling (idler roller).

Yet another object of the present invention is to provide a means for determining the coefficient of friction between a driven web and an idler roller.

Still another object of the present invention is to provide a device for measuring torque on a rotating element imparted by a moving surface in contact with the rotating element.

Briefly stated, the foregoing and numerous other features, objects and advantages of the present invention will become readily apparent to those skilled in the art upon a review of the specification, claims and drawings set forth herein. These features, objects and advantages are accomplished by providing a tachometer coupled to a torque meter in an arrangement that includes a cantilevered drive shaft adapted to interface with a socket-head screw that captures a bearing mounted to an end of an idler roller. The socket-head screw capture bearing can extend beyond the enclosed environment of the operating process. In such manner, the operator of the device of the present invention can avoid exposure to the potentially hazardous process temperatures and gases. The tool includes a hand brake extending from the torque meter. A single person can operate the tool merely by inserting a cantilevered drive shaft into the bearing capture thereby causing the idler roller to drive rotation of the shaft of the torque meter and also the tachometer. The device can be operated by applying pressure to the hand brake allowing the operator to observe both the tachometer and the torque meter. When the operator sees a decrease in rotational speed as detected (indicating the web is slipping on the idler roller surface) by the tachometer, the operator merely needs to read the value of the force as detected by the torque meter at that point in time. It is this amount of force minus bearing losses that the moving web is transferring to the idler roller.

BRIEF DESCRIPTION OF THE DRAWINGS

FIG. 1 is a side elevational view of the traction meter tool of the present invention.

FIG. 2 is a front elevational view of the traction meter tool of the present invention.

DETAILED DESCRIPTION OF THE INVENTION

Figure 3:
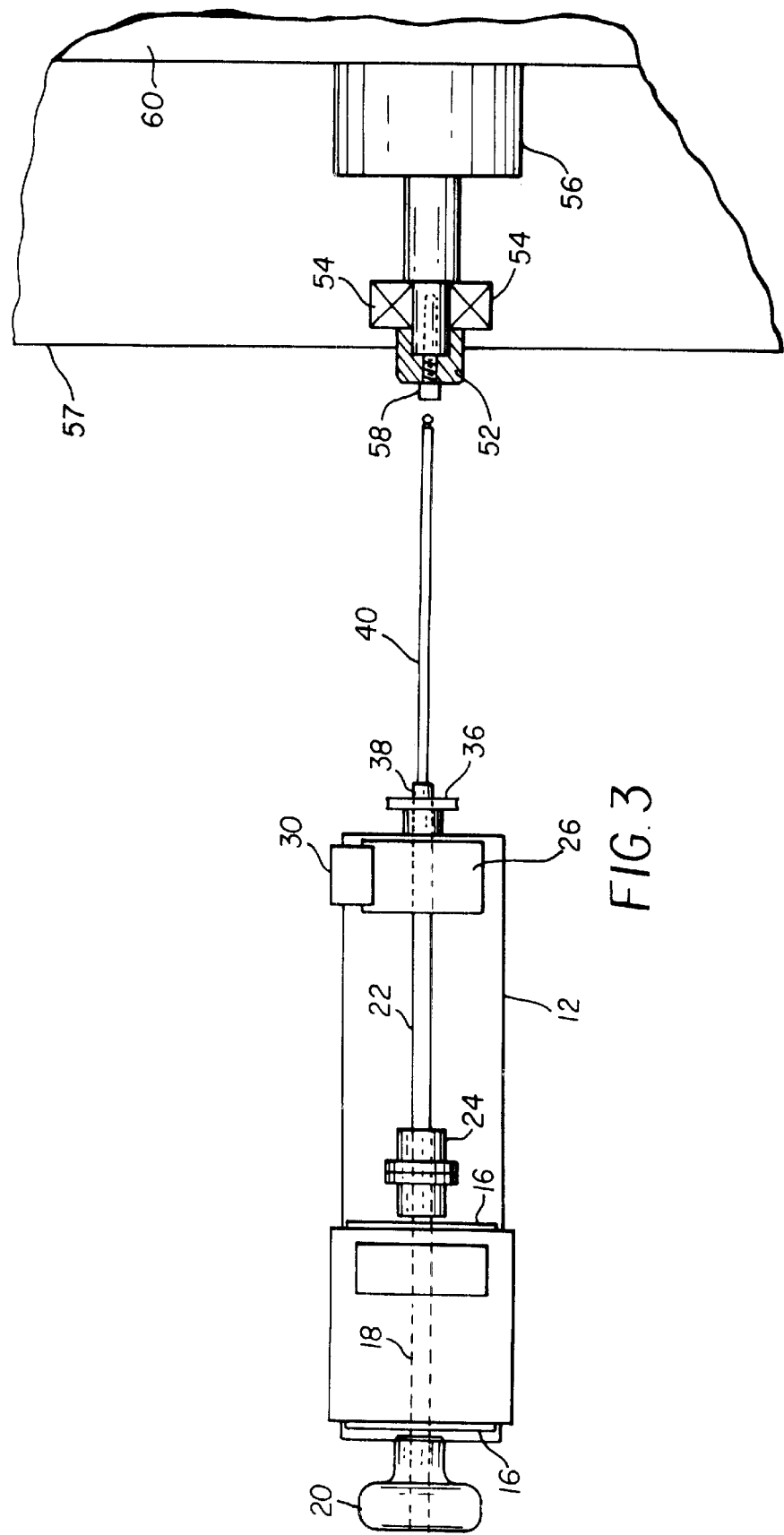
FIG. 3 is a top plan view of the traction meter tool of the present invention with the distal end of the drive shaft in position to be inserted into the socket-head screw of the capture bearing mounted on an idler roller.

Turning first to FIGS. 1 and 2, there are respectively shown a side elevational view and a front elevational view of the traction meter tool 10 of the present invention. Traction meter tool 10 includes a frame 12 in which a torque meter 14 is mounted by means of brackets 16. An exemplary torque meter which can be used in the production of traction meter tool 10 is the TDS-DN-TM1 02360, as manufactured by GTC Falcon, Inc. of Plymouth, Mass. The torque meter 14 includes a meter shaft 18 which has mounted on one end thereof a knob 20 which serves as a hand brake. Meter shaft 18 is coupled to transfer shaft 22 by means of flexible coupling 24. Also mounted to frame 12 is bearing block 26 which has installed therein bearings 28 providing rotational support for transfer shaft 22. Mounted to one side of bearing block 26 is support bracket 30. Affixed to support bracket 30 is an upper bearing block 32 which includes bearings 34. Attached to transfer shaft 22 on the end thereof opposite flexible coupling 24 is lower pulley 36. Lower pulley 36 includes an integral coupling 38 from which drive shaft 40 extends. In essence, meter shaft 18, transfer shaft 22 and drive shaft 40 are coupled to form a single drive shaft. Bearings 34 provide residence for drive shaft 42 in bearing block 32. Upper pulley 44 is mounted to one end of drive shaft 42. Belt 46 loops around pulleys 36, 44. There is a flexible coupling 48 attaching drive shaft 42 to tachometer 50.

Looking next at FIG. 3, there is shown a top plan view of the traction meter tool of the present invention with the distal end of drive shaft 40 in position to be inserted into bearing capture 52. Bearing capture 52 is retained on bearing 54 of idler roller 56 by means of socket head screw 58. Rotation of idler roller 56 is driven by frictional engagement between moving web 60 and the surface of idler roller 56. As suggested above, bearing capture 52 can extend beyond enclosure 57 so that the tool operator is not exposed to the atmosphere within enclosure 57.

In operation, the user of the traction tool measuring device 10 of the present invention manually supports the device 10 by grasping handle 62 and positions the device 10 such that the distal end of drive shaft 40 is inserted into bearing capture 52. The engagement of the tool can take place in either the running state or idle state of the system or process that includes the idler roller 56. Once inserted into the socket head screw bearing capture 52, drive shaft 40 is rotationally driven through the rotation of idler roller 56. Rotation of tachometer 50 is simultaneously driven through operation of pulleys 36, 44 and belt 46 which drive the rotation of drive shaft 42 and is coupled to tachometer 50. Thus, the tachometer 50 begins to show the revolutions per minute (rpm) of the idler roller 56. Once the rpm come to a steady state the operator starts to squeeze the hand brake 20 slowly while simultaneously observing both the tachometer 50 and the torque meter 14. The torque meter 14 will start to read a value in inch pounds of force. As soon as the operator can detect a decrease in rpm as registered on the tachometer 50, the operator reads the value registered on the torque meter 14. It is this amount of force registered on the torque meter 14 that the moving web 60 transfers to the idler roller 56 (minus bearing losses). The decrease in rpm indicates that the moving web 60 is beginning to slip across the surface of idler roller 56 rather then drive the rotation of idler roller 56.

Those skilled in the art will recognize that means other than pulleys 36, 44 and belt 46 can be utilized to drive rotation of upper drive shaft 42 from the rotation of lower drive shaft 40. For example, intermeshing gears can be mounted to drive shafts 40, 42.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 traction meter tool
12 frame
14 torque meter
16 brackets
18 meter shaft
20 knob/hand brake
22 transfer shaft
24 flexible coupling
26 bearing block
28 bearings
30 support bracket
32 upper bearing block
34 bearings
36 lower pulley
38 integral coupling
40 drive shaft
42 drive shaft
44 upper pulley
46 belt
48 flexible coupling
50 tachometer
52 bearing capture
54 bearing
56 idler roller
57 enclosure
58 socket head screw
60 web
62 handle

What is claimed is:

1. A device for measuring force transferred from a moving web to an idler roller comprising:

(a) a first drive shaft having a distal end adapted to be inserted into a capture bearing mounted on the idler roller;

(b) a torque meter rotationally driven by the first drive shaft, the torque meter including a manual braking handle; and (c) a tachometer rotationally driven by the first drive shaft, the torque meter registering the force transferred by the moving web to the idler roller when the manual braking handle is operated to show a reduction in the rotational speed of the idler roller.

2. A device as recited in claim 1 further comprising:

(a) a frame on which the torque meter is mounted;

(b) a first bearing block mounted to the frame, the first drive shaft being rotationally supported through the first bearing block;

(c) a second bearing block mounted above the first bearing block;

(d) a second drive shaft rotationally supported through the second bearing block, the second drive shaft connected to the torque meter; and (e) means for driving rotation of the second drive shaft through rotation of the first drive shaft.

3. A device as recited in claim 2 wherein the means for driving is:

(a) a first pulley mounted to the first drive shaft;

(b) a second pulley mounted to the second drive shaft; and (c) a drive belt looped around the first and second pulleys.

4. A device as recited in claim 2 further comprising:

a handle extending from the frame for allowing a user to manually support the device.

5. A device as recited in claim 2 further comprising:

(a) a bracket extending from the first bearing block and supporting the second bearing block; and (b) at least one bearing mounted in each of the first and second bearing blocks.

6. A device as recited in claim 1 wherein:

the capture bearing extends beyond an enclosure in which the moving web and idler roller reside allowing an operator to measure the force transferred from the moving web to the idler roller without entering the enclosure.

7. A method for measuring force transferred from a moving web to an idler roller comprising the steps of:
   (a) inserting a distal end of a first drive shaft into a capture bearing mounted on the idler roller, the first drive shaft driving rotation of a torque meter and a tachometer;
   (b) observing when the tachometer registers a steady state rotational speed;
   (c) applying a braking force to the torque meter until the rotational speed registered on the tachometer begins to decrease; and
   (d) reading the torque meter when the rotational speed registered on the tachometer begins to decrease.

8. A device for measuring force transferred from a moving web to an idler roller comprising:
   (a) a first drive shaft having a free distal end disengagably insertable into a capture bearing mounted on the idler roller;
   (b) a torque meter rotationally driven by the first drive shaft, the torque meter including a manual braking handle; and
   (c) a tachometer rotationally driven by the first drive shaft, the torque meter registering the force transferred by the moving web to the idler roller when the manual braking handle is grasped by a user to apply a braking force to the torque meter until the rotational speed registered on the tachometer begins to decrease.

* * * * *